W. B. SCAIFE.

Metallic Vessels.

No. 6,392. Reissued April 20, 1875.

Witnesses
John Becker.
Geo. Haynes

Wm. B. Scaife
by his Attorneys
Brown & Allen

UNITED STATES PATENT OFFICE.

WILLIAM B. SCAIFE, OF PITTSBURG, PENNSYLVANIA.

IMPROVEMENT IN METALLIC VESSELS.

Specification forming part of Letters Patent No. 28,014, dated April 24, 1860; extended seven years; reissue No. 6,392, dated April 20, 1875; application filed January 7, 1875.

DIVISION B.

*To all whom it may concern:*

Be it known that I, WILLIAM B. SCAIFE, of Pittsburg, in the county of Allegheny and State of Pennsylvania, have invented a new and useful Improvement in Sheet-Metal Vessels for containing oil and other substances; and I do hereby declare that the following is a full, clear, and exact description of the same, reference being had to the accompanying drawing which forms part of this specification.

This invention relates to all kinds of vessels for containing oils or other substances, whether such vessels be known as casks, kegs, or cans, or by other names. The improvement consists in the construction of such vessels with a new kind of lap-joint for uniting the heads or ends with the sides or bodies of such vessels, and forming the chime, whereby not only is great security obtained, but great facility is afforded for soldering when a soldered joint is required. This joint has two characteristic features, viz: First, the edge of the head is turned outward, to form a flange, at an angle to its face, and the end of the body or sides of the vessel is turned inward over the said flange on the head, to form another flange, between which and the body of the vessel the aforesaid flange on the head is securely clamped, the so clamped and clamping portions of the head and body of the vessel extending outwardly beyond the face of the head in a manner corresponding with the chine of a cask; second, the portion of the body within which the head is received is offset, and so made wider than the adjacent portion, occupying a position farther from the end of the body, and is of such form as to constitute, in the sheet metal of which the body or sides of the vessel are composed, and without the necessity of any additional piece, a shoulder upon or against which the head may be supported during the turning in of the flange of the body over the flange of the head, and upon which the head is held firmly by the flange of the body after the joint is complete.

Figure 1:
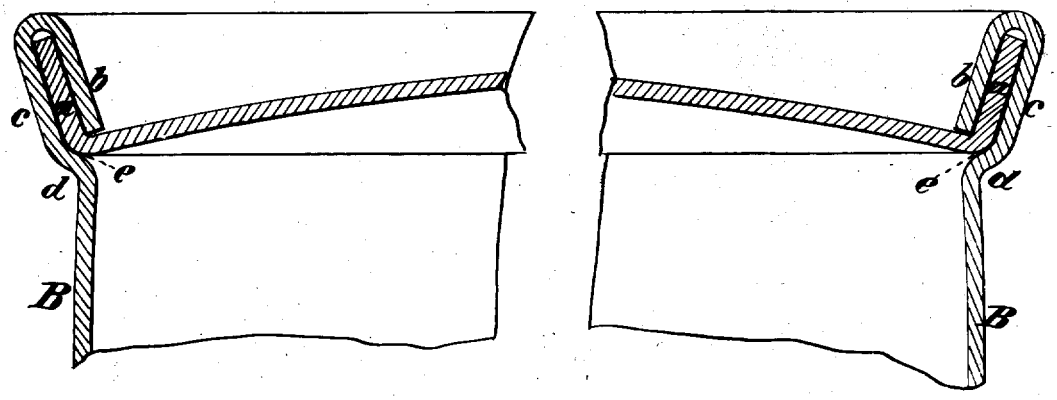
Figure 1:
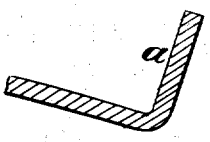
Figure 2:
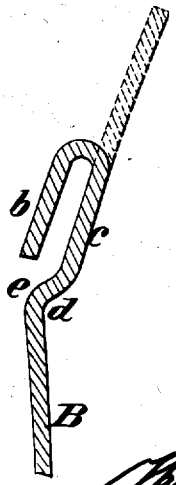

Figure 1 of the drawing represents a central section of one of the heads and the adjacent portions of the sides or body of a vessel, showing the improved joint. Fig. 2 shows the two portions of the joint separated.

Similar letters of reference indicate corresponding parts in both figures.

These views show the thickness of metal and size of the joint somewhat exaggerated in size, the better to explain the construction.

A represents the head of the vessel, and B B represent contiguous parts of the sides or body. *a* is the outwardly-turned flange on the head. *b* is the inwardly-turned flange on the end of the body which laps over the flange *a*, and between which and the portion *c* of the body the flange *a* is clamped. It will be seen that the flanges *a* and *b*, and the part *c*, combine to form a chine-like extension of the body beyond the end of the vessel. The portion *c* of the body is made wider than the portion *d*, below or farther from the end, and by that means, in the lower part of the said portion *c*, there is formed an offset-shoulder, *e*, for the support of the head.

The body or sides of the vessel may be made of as many pieces or sheets of metal as may be necessary or desirable, and the longitudinal seam or seams may be formed and soldered up in any suitable manner. The end portions of the sheet or sheets which form the body may have the proper form given to them for the reception of the head, either before or after the body has been formed. The head may be either flat or convex. Its flange *a* is turned outward before its application to the body. When the body has been formed, the head is placed within the portion *c* of the body and on the shoulder *e*, and the marginal portion, which has previous to this occupied the position shown in dotted lines in Fig. 2, is then turned inward over the flange *a*, thus forming the flange *b*, between which and the portion *c* the said flange *a* is tightly clamped by pressure suitably applied. If the lap joint thus formed is to be soldered, the solder may be applied in any known or suitable manner.

What I claim as my invention is—

A metallic vessel having the heads constructed with a flange, *a*, and the body with an offset shoulder, *e*, and overlapping extensions *c b*, forming a chine, substantially as described.

Witnesses: W. B. SCAIFE.

JAMES J. JOHNSTON,

W. N. PAXTON.